March 6, 1956  M. W. SIMS  2,737,612
DISCHARGE SYSTEM

Filed Feb. 9, 1953  2 Sheets-Sheet 1

Inventor:
Marion W. Sims,
by *Robert G. Ivis*
His Attorney.

March 6, 1956  M. W. SIMS  2,737,612
DISCHARGE SYSTEM
Filed Feb. 9, 1953  2 Sheets-Sheet 2
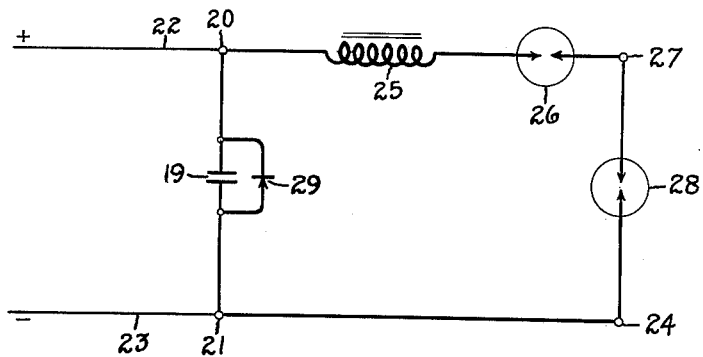
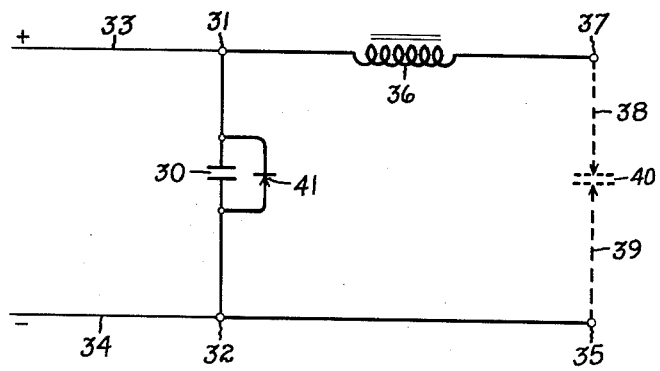
Inventor:
Marion W. Sims,
by *[signature]*
His Attorney.

United States Patent Office 2,737,612
Patented Mar. 6, 1956

2,737,612

DISCHARGE SYSTEM

Marion W. Sims, Fort Wayne, Ind., assignor to General Electric Company, a corporation of New York Application February 9, 1953, Serial No. 335,666

2 Claims. (Cl. 315—177)

This invention relates to discharge systems such as ignition systems and more particularly to systems of the capacitor discharge type.

It has been found that the capacitor discharge-type of ignition system is desirable for certain applications, such as in aircraft gas turbines, and an improved system of this type is shown in copending application Serial No. 299,416 filed July 17, 1952, now Patent 2,717,335 issued September 6, 1955, in the name of Marion W. Sims, Ezra C. Hill and Aaron M. Krakower, and assigned to the assignee of the present application. This system comprises a main discharge circuit including a main storage capacitor, an inductance, which is actually the secondary of a step-up transformer, and the ignition gap. The primary winding of the transformer is connected in a loop circuit with an auxiliary gap and a triggering capacitor, the triggering capacitor being connected for charging across the main capacitor through a timing resistor. The auxiliary gap is arranged to break down before the main ignition gap and thus discharges the triggering capacitor through the transformer primary. This induces a high voltage in the transformer secondary, breaking down the ignition gap so that the main capacitor discharges through the transformer secondary and the gap. As pointed out in the above-mentioned application Serial No. 299,416, now Patent No. 2,717,335, it is desirable that the resistance of the main discharge circuit be kept as low as possible. The main discharge circuit is thus a resonant circuit and once the main capacitor has fired, oscillation continues, damped only by the ignition gap and unavoidable circuit losses, until the original energy stored in the main capacitor has been dissipated.

Capacitor discharge systems are not restricted to high voltage circuits and a typical low voltage system includes a main storage capacitor, an inductance, and a triggering gap connected in a loop circuit with an ignition gap which does not require a high ionizing voltage, such as a surface discharge type of gap. Here again, after the ignition gap is broken down, a resonant circuit is provided which will oscillate until the energy stored in the main capacitor has been dissipated.

In addition, capacitor discharge systems may be utilized for application other than ignition, for example, welding. In such a system, the storage capacitor and an inductance are connected across the welding electrodes, thus again producing an oscillatory circuit after the welding arc has been struck.

It has been found that the oscillation of the discharge circuit in a capacitor discharge system produces various high frequency losses and it is therefore desirable to modify the circuit to produce a high current inductive discharge without oscillation. Insertion of additional resistance in the discharge circuit is not practicable since, by virtue of the high currents involved, the losses therein would be disproportionately large. It is therefore desirable to provide means for preventing oscillation of the discharge circuit without introducing additional resistance.

An object of this invention is therefore to provide an improved capacitor discharge system incorporating the desirable features set forth above.

Further objects and advantages of this invention will become apparent and the invention will be better understood by reference to the following description and the accompanying drawing, and the features of novelty which characterize this invention will be pointed out with particularity in the claims annexed to and forming a part of the specification.

In accordance with one embodiment of this invention, a capacitor discharge system of the type described in the aforementioned application Serial No. 299,416, now Patent No. 2,717,335, is provided. This system comprises a main storage capacitor, adapted to be charged from a source of direct current, connected in a main discharge circuit with a high voltage secondary transformer winding and an ignition gap. A triggering capacitor is provided connected for charging through a timing resistance across the main capacitor and also connected in a closed loop circuit with a triggering gap and the low voltage primary winding of the transformer. The charge across the triggering capacitor causes the triggering gap to break down before the main ignition gap thus discharging the triggering capacitor through the transformer primary winding. This induces a high voltage in the transformer secondary breaking down the ignition gap so that the main capacitor discharges through the transformer secondary and the gap. In order to prevent oscillation of the main discharge circuit, a unilateral current conducting device is connected across the main capacitor. This device short circuits the main capacitor at the instant its voltage goes through the first zero after discharge thus providing a high current inductive discharge and preventing the arc power from going through zero until the discharge is completed.

In accordance with another embodiment of this invention, a low voltage capacitor discharge ignition system is provided comprising a storage capacitor adapted to be charged from a source of direct current and connected in series with an inductance and a triggering gap across an ignition gap. In order to prevent oscillation of this circuit, a unilateral current conducting device is connected across the capacitor, again short-circuiting the capacitor at the instant its voltage goes through the first zero after discharge thereby providing a high current inductive discharge.

A further embodiment of this invention provides a capacitor discharge welding circuit comprising a storage capacitor adapted to be connected across a source of direct current and being connected in series with an inductance and the welding electrodes. Oscillation of the circuit after the welding arc has been struck is again prevented by a unilateral current conducting device connected across the storage capacitor.

In the drawing, Fig. 1 is a schematic circuit diagram of the improved capacitor discharge ignition system of this invention;

Fig. 3 is a schematic circuit diagram of a low voltage capacitor discharge ignition system in accordance with this invention; and Fig. 4 schematically illustrates a capacitor discharge welding circuit incorporating this invention.

Figure 1:
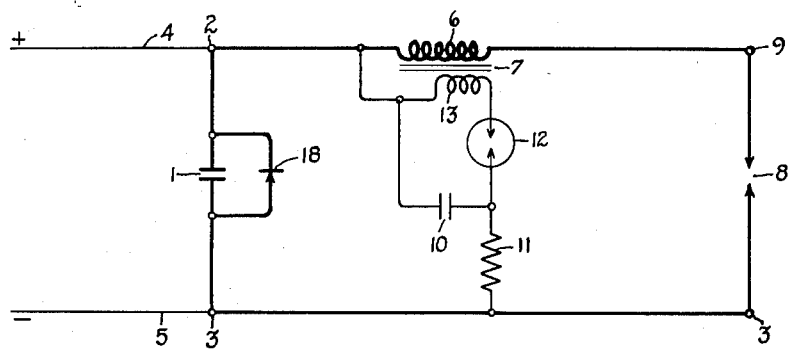

Referring now to Fig. 1, there is shown a main capacitor 1 connected between input terminal 2 and common terminal 3. Terminals 2 and 3 are adapted to be connected to a source of direct current as by lines 4 and 5, it being understood that a voltage stabilizing circuit of the type shown in the aforementioned application Serial No. 299,416, now Patent No. 2,717,335, may be utilized as a source of unidirectional current.

Main storage capacitor 1 is connected in a main discharge circuit, shown by heavy lines, including high voltage secondary winding 6 of ionization transformer 7 and ignition gap 8. More specifically, high voltage secondary winding 6 of transformer 7 is connected between input terminal 2 and output terminal 9. The ignition gap 8, which may be any suitable spark discharge device and does not form a part of this invention, is adapted to be connected across output terminal 9 and common terminal 3.

In order to trigger the discharge of main capacitor 1, triggering capacitor 10 is provided serially connected with timing resistor 11 across input terminal 2 and common terminal 3. A sealed trigger gap 12 is then serially connected with the low voltage primary winding 13 of transformer 7 across triggering capacitor 10 forming a closed loop circuit.

With the system as thus far described, upon application of a direct current voltage across input terminal 2 and common terminal 3, charges build up upon main capacitor 1 and triggering capacitor 10, the charging of capacitor 10 being slowed to the desired extent by the requirement that the charging current flow through timing resistor 11. When the voltage across triggering capacitor 10 reaches the breakdown value of sealed trigger gap 12, which is substantially lower than the voltage required to break down ignition gap 8, trigger gap 12 arcs over thus applying the full voltage of triggering capacitor 10 to the low voltage primary winding 13 of transformer 7. This results in a high voltage being induced in high voltage primary winding 6 of transformer 7 causing the main ignition gap 8 to break down, thus completing the main discharge circuit comprising the main storage capacitor 1, the high voltage secondary winding 6 of transformer 7, and ignition gap 8. Main capacitor 1 thus discharges through high voltage secondary winding 6 of transformer 7 and the ignition gap 8.

Figure 2:
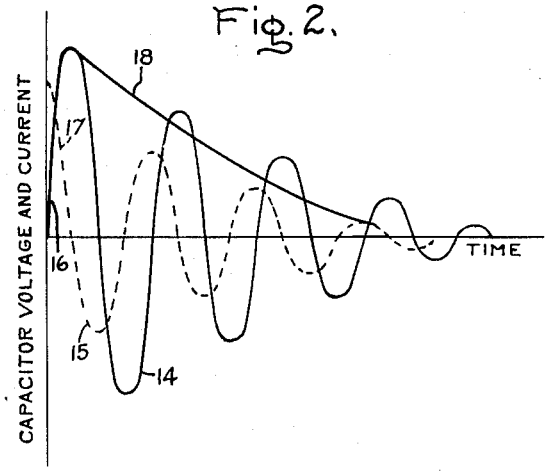
Fig. 2 illustrates typical voltage and current curves of the system of the aforementioned application Serial No. 299,416 compared with the current curve for the improved system of this invention.

Referring now to Fig. 2, the curve shown by the solid line 14 represents the configuration of the discharge current flowing in the capacitor 1 of the circuit as thus far described and the dashed line 15 similarly represents the configuration of the voltage across capacitor 1. It can be readily seen that the circuit as thus far described is a simple series resistance-inductance-capacitance resonant circuit with an initial charge on the main capacitor 1. When capacitor 1 initially discharges, the current in the circuit builds up as shown by initial portion 16 of current wave 14 while its voltage, as shown by initial portion 17 of voltage wave 15 goes down. The voltage across capacitor 1 reaches zero as the current flow reaches a maximum and the current flow would thus ordinarily cease were it not for the inductive effect of transformer secondary winding 6 which tends to keep current flowing in the same direction. The inductance of winding 6 thus charges capacitor 1 in the opposite polarity and the oscillation continues, as shown by curves 14 and 15 until the unavoidable losses in the circuit have completely dissipated the initial charge on main capacitor 1.

As pointed out above, it is desirable to eliminate the oscillation of the main discharge circuit without inserting additional resistance. To accomplish this objective, a unilateral current conducting device 18, such as a selenium cell, is connected across main capacitor 1. The unilateral current conducting device or blocking rectifier 18 thus short circuits the main capacitor 1 at the instant its voltage goes through the first zero thus preventing oscillation and producing a high current inductive discharge. Referring again to Fig. 2, upon initial discharge of main capacitor 1, the current 16 will again rise as the voltage 17 decreases. When the voltage first reaches zero, however, the presence of blocking rectifier 18 prevents capacitor 1 from being charged in the opposite direction and the circuit becomes a simple resistance-inductance loop with secondary winding 6 of transformer 7 maintaining the current flow until it is dissipated by the other losses in the system. Thus, a high current inductive discharge, as shown by the heavy line 18 in Fig. 2 is produced preventing the power in the arc of ignition gap 8 from going through zero until the discharge is completed and eliminating the inherent high frequency losses produced by oscillation in the circuit.

It will now be apparent that the use of a unilateral current conducting device connected across the capacitor may be used in any circuit intended to transfer the energy stored in a capacitor through an inductance to some dissipative element. The use of the unilateral current conducting device permits the capacitor energy to be transferred to the inductance without oscillation thus permitting a single inductive discharge of high intensity. Thus, this invention is not restricted to high voltage capacitor discharge ignition circuits as hereinbefore described, but may also be used with other capacitor discharge ignition circuits, for example, a circuit having a gap which does not require a high ionizing voltage, such as a surface discharge type gap.

Referring now to Fig. 3, there is shown a low voltage capacitor discharge ignition system having a storage capacitor 19 connected across input terminals 20 and 21 which are adapted to be connected to an external source of direct current through lines 22 and 23. Input terminal 21 is connected to output terminal 24 while inductance 25 and sealed triggering gap 26 are serially connected between the input terminal 20 and output terminal 27. A suitable ignition gap, such as a surface discharge type gap 28, is adapted to be connected across output terminals 24 and 27. It will be readily seen that after breakdown of the ignition gap 28, a resonant circuit is provided and in order to prevent oscillation of this circuit, a unilateral current conducting device 29 is connected across main capacitor 19.

Referring now to Fig. 4, there is shown a capacitor discharge welding circuit having a main capacitor 30 connected across input terminals 31 and 32 which are adapted to be connected across a source of direct current by lines 33 and 34. Input terminal 32 is connected to output terminal 35 and inductance 36 is connected between input terminal 31 and output terminal 37. Welding electrodes 38 and 39 are adapted to be connected across output terminals 35 and 37. It will be readily seen that when electrodes 38 and 39 are brought into contact with work 40, the circuit is completed and that a resonant circuit is again provided. Here again, in order to prevent oscillation of this circuit and to provide high current inductive discharge, a unilateral current conducting device 41 is connected across a storage capacitor 30.

It will now be seen that this invention eliminates the undesirable oscillation in a capacitor discharge system producing a desirable high current inductive discharge with a resultant increase in efficiency of the system and ignition ability of the working gap.

While I have shown and described particular embodiments of this invention, further modifications and improvements will occur to those skilled in the art, for example, the oscillation eliminating feature of this invention could be applied to any of the circuits disclosed in the aforementioned application Serial No. 299,416, now Pat. No. 2,717,335. I desire it to be understood, therefore, that this invention is not limited to the particular form shown and I intend in the appended claims to cover all modifications which do not depart from the spirit and scope of this invention.

What I claim as new and desire to secure by Letters Patent of the United States is:

1. A capacitor discharge ignition system comprising, in combination, a main energy storage capacitor adapted to be charged from a source of unidirectional voltage, a triggering capacitor connected to be charged through a resistor by said source, a voltage step-up transformer having a low voltage primary winding and a high voltage secondary winding, a circuit completing triggering device connected to discharge said triggering capacitor through said low voltage primary winding when the voltage charge on said triggering capacitor attains a predetermined value, said transformer having at least said secondary winding connected directly in series with said main capacitor forming a discharge circuit, an ignition gap connected in said discharge circuit, and a unilateral current conducting device connected across said main capacitor whereby oscillation of said discharge circuit is prevented.

2. A capacitor discharge ignition system comprising a main energy storage capacitor adapted to be charged from a source of unidirectional voltage, a triggering capacitor connected to be charged through a resistor by said source, a voltage step-up transformer having a low voltage primary winding and a high voltage secondary winding, a trigger gap connected to discharge said triggering capacitor through said low voltage primary winding when the voltage charge on said triggering capacitor obtains a predetermined value, said transformer having at least said secondary winding connected directly in series with said main capacitor forming a discharge circuit, an ignition gap connected in said discharge circuit, and means for short-circuiting said main capacitor at the instant its voltage goes through zero after discharge whereby oscillation of said discharge circuit is prevented.

References Cited in the file of this patent

UNITED STATES PATENTS

| | | |
|---|---|---|
| 2,235,385 | Rava | Mar. 18, 1941 |
| 2,310,092 | Knowles | Feb. 2, 1943 |
| 2,497,307 | Lang | Feb. 14, 1950 |
| 2,503,054 | Laird | Apr. 4, 1950 |
| 2,551,101 | De Benham et al. | May 1, 1951 |